(12) United States Patent
Liu et al.

(10) Patent No.: US 11,831,505 B2
(45) Date of Patent: Nov. 28, 2023

(54) METHOD AND SYSTEM OF HYBRID DATA-AND-MODEL-DRIVEN HIERARCHICAL NETWORK RECONFIGURATION

(71) Applicant: North China Electric Power University, Beijing (CN)

(72) Inventors: Nian Liu, Beijing (CN); Liudong Chen, Beijing (CN); Chenchen Li, Beijing (CN)

(73) Assignee: North China Electric Power University, Beijing (CN)

( * ) Notice: Subject to any disclaimer, the term of this patent is extended or adjusted under 35 U.S.C. 154(b) by 297 days.

(21) Appl. No.: 17/367,144

(22) Filed: Jul. 2, 2021

(65) Prior Publication Data

US 2022/0078082 A1 Mar. 10, 2022

(30) Foreign Application Priority Data

Sep. 9, 2020 (CN) .......................... 202010938797.5

(51) Int. Cl.
*H04L 41/0833* (2022.01)
*G06N 3/08* (2023.01)
*G06N 3/044* (2023.01)

(52) U.S. Cl.
CPC ......... *H04L 41/0833* (2013.01); *G06N 3/044* (2023.01); *G06N 3/08* (2013.01)

(58) Field of Classification Search
CPC ................................................. H04L 41/0833
See application file for complete search history.

(56) References Cited

U.S. PATENT DOCUMENTS

| | | | |
|---|---|---|---|
| 10,083,034 B1 * | 9/2018 | Satpathy | H03M 7/6005 |
| 11,062,047 B2 * | 7/2021 | Mukherjee | G06F 21/6245 |
| 2019/0165804 A1 * | 5/2019 | Amaral | H03M 7/48 |
| 2020/0039377 A1 * | 2/2020 | Pettersson | G06N 20/00 |
| 2022/0078082 A1 * | 3/2022 | Liu | H04L 41/145 |
| 2023/0053134 A1 * | 2/2023 | Kim | G05D 1/0088 |
| 2023/0090906 A1 * | 3/2023 | Shinagawa | G06T 7/0012 382/181 |
| 2023/0131251 A1 * | 4/2023 | Edo Vivancos | G06F 12/0238 711/170 |

* cited by examiner

*Primary Examiner* — Guang W Li
(74) *Attorney, Agent, or Firm* — David R. Stevens; Stevens Law Group (57) ABSTRACT

A method and a system of hybrid data-and-model-driven hierarchical network reconfiguration are provided. Taking into account that the optimal operation structure of the power grid may change after a new energy is connected into the power grid in the distribution manner, this method combines the mathematical model of network reconfiguration and clustering with the deep learning model, and uses data recorded by the smart meter, to reconfigure the network in a hybrid data-and-model driving mode. This method proposes a network compression method and a hierarchical decompression method based on deep learning, and improves the efficiency of network reconfiguration by the way of distributed calculation and combination of on-line and off-line calculation.

8 Claims, 4 Drawing Sheets

METHOD AND SYSTEM OF HYBRID DATA-AND-MODEL-DRIVEN HIERARCHICAL NETWORK RECONFIGURATION

CROSS-REFERENCE TO RELATED APPLICATION

This application claims the benefit of Chinese Application Serial No. CN 202010938797.5 filed on Sep. 9, 2020, which is hereby incorporated herein by reference in its entirety

TECHNICAL FIELD

The present disclosure relates to the field of distribution network reconfiguration, and in particular to a method and a system of hybrid data-and-model-driven hierarchical network reconfiguration.

BACKGROUND

The purpose of distribution network reconfiguration is to find the optimal on-and-off combination of all switches in the distribution network, and to achieve the goals such as minimizing network power losses and improving system economy on the premise of the system running in a radial structure and meeting the constraints of node voltage and power. The switch state is a binary variable, while the power flow of the system is a continuous variable, so the distribution network reconfiguration refers to a mixed integer non-linear programming issue of which the solving methods may generally consist of mathematical optimization algorithms and intelligent algorithms. Large-scale networks are difficult to solve only by using mathematical programming algorithms, while the use of intelligent algorithms requires traversing all possible situations and calculating the power flow distribution within the whole network for many times, thus requiring a long time on on-line calculation and a lot of calculation resources.

SUMMARY

The purpose of the present disclosure is to provide a method and a system of hybrid data-and-model-driven hierarchical network reconfiguration, which may reduce the solution space, lessen the calculation complexity, and improve the calculation speed to a certain extent.

In order to achieve the above purpose, the present disclosure provides the following scheme:

A method of hybrid data-and-model-driven hierarchical network reconfiguration, including:

Based on a distribution network structure and interconnection switches, the distribution network is sectioned into loops, and a compression network is established through the network compression process;

Based on the compression network, a distribution network reconfiguration model and a clustering model aiming at the same reconfiguration strategy are established, and the distribution network reconfiguration model is solved to obtain the optimal reconfiguration combination result and clustering result of the distribution network under a certain load condition;

By learning the clustering result, an off-line database is acquired for the compression network model;

Based on the off-line database of the compression network model, a network decompression model is constructed to acquire a plurality of parallel decompression networks;

It is determined whether an open switch in each loop of the decompression networks is a section switch acquired through equivalence of No sectionalizing switches in the original network or not;

If not, the reconfiguration combination results and the clustering results of the plurality of parallel decompression networks are calculated according to the distribution network reconfiguration model and the clustering model;

By learning the clustering results of the parallel decompression networks, off-line databases are acquired for the decompression networks;

Based on the parallel decompression networks together with the off-line databases thereof, the next layer of a plurality of parallel decompression networks are acquired, and the process returns to the step "determining if an open switch in each loop of the decompression network is a sectionalizing switch acquired through equivalence of No sectionalizing switches in the original network or not";

And if yes, uncompressed switches in all loops are to be permuted and combined, and then taken into a power flow calculation model of the distribution network reconfiguration model by combining the switch states confirmed by the off-line databases to calculate the network power flows and network losses, and then the switch combination with the smallest network loss is selected as the final reconfiguration scheme.

Optionally, based on the compression network, the distribution network reconfiguration model and the clustering model aiming at the same reconfiguration strategy are established, and the distribution network reconfiguration model is solved to obtain the optimal reconfiguration combination result and clustering result of the distribution network under a certain load condition, which specifically includes:

Based on the compression network, the distribution network reconfiguration model is established, the harmony search algorithm is adopted, and the distribution network reconfiguration model is solved to acquire the optimal reconfiguration combination result under a certain load condition;

Based on the optimal reconfiguration combination result, the clustering is performed which aims at the same strategy under the minimum network loss to acquire the clustering results.

Optionally, by learning the clustering result, the off-line databases are acquired for the compression network model, which specifically includes:

The LSTM deep learning network is used to learn the clustering results, wherein each cluster forms one category to learn, and various weight coefficients are formed for the category, thus forming off-line databases of the compression network model.

Optionally, the uncompressed switches in all loops are to be permuted and combined, and then taken into the power flow calculation model of the distribution network reconfiguration model by combining the switch states confirmed by the off-line databases to calculate the network power flows and network losses, and then the switch combination with the smallest network loss is selected as the final reconfiguration scheme, which specifically includes:

The uncompressed switches in all loops are permuted and combined by enumeration, and then taken into the power flow calculation model of the distribution network reconfiguration model by combining the switch states confirmed by the off-line databases to calculate the network power flows and network losses, and then the switch combination with the smallest network loss is selected as the final reconfiguration scheme.

A system of hybrid data-and-model-driven hierarchical network reconfiguration, including:

A compression network establishing module, which is used for sectioning the distribution network into loops based on a distribution network structure and interconnection switches, and establishing a compression network through the network compression process;

A first confirmation module of reconfiguration combination results, which is used for establishing the distribution network reconfiguration model and the clustering model aiming at the same reconfiguration strategy based on the compression network, and solving the distribution network reconfiguration model to acquire the optimal reconfiguration combination results and clustering results of the distribution network under a certain load condition;

A first confirmation module of off-line databases, which is used for acquiring the off-line databases for the compression network model by learning the clustering results;

A confirmation module of parallel decompression networks, which is used for constructing the network decompression model based on the off-line databases of the compression network model to acquire a plurality of parallel decompression networks;

A determination module, which is used for determining whether the open switch in each loop of the decompression networks is a sectionalizing switch acquired through equivalence of No sectionalizing switches in the original network or not;

A second confirmation module of reconfiguration combination results, which is used for, if the open switch in each loop of the decompression networks is not the sectionalizing switch acquired through equivalence of No sectionalizing switches in the original network, calculating the reconfiguration combination results and the clustering results of the plurality of parallel decompression networks according to the distribution network reconfiguration model and the clustering model;

A confirmation module of off-line databases, which is used for acquiring off-line databases for the decompression networks by learning the clustering results of the parallel decompression networks;

A confirmation module of the next layer of parallel decompression networks, which is used for acquiring the next layer of a plurality of parallel decompression networks based on the parallel decompression networks and the off-line database thereof;

A return module used for returning to the step of "determining whether the open switch in each loop of the decompression networks is a sectionalizing switch acquired through equivalence of No sectionalizing switches in the original network or not";

A confirmation module of final reconfiguration scheme, which is used for, if the open switch in each loop of the decompression networks is the sectionalizing switch acquired through equivalence of No sectionalizing switches in the original network, permuting and combining uncompressed switches in all loops, taking their results into the power flow calculation model of the distribution network reconfiguration model by combining the switch states confirmed by the off-line databases to calculate the network power flows and network losses, and then selecting the switch combination with the smallest network loss as the final reconfiguration scheme.

Optionally, the first confirmation module of reconfiguration combination result specifically includes:

A confirmation unit for optimal reconfiguration combination results, which is used for establishing the distribution network reconfiguration model based on the compression network, adopting the harmony search algorithm, and solving the distribution network reconfiguration model to acquire the optimal reconfiguration combination result under a certain load condition;

A clustering result confirmation unit, which is used for performing the clustering which aims at the same strategy under the minimum network loss based on the optimal reconfiguration combination results to acquire the clustering results.

Optionally, the first confirmation module of off-line databases specifically includes:

A first confirmation module of off-line databases, which is used for adopting the LSTM deep learning network to learn the clustering results, wherein each cluster forms one category to learn, and various weight coefficients are formed for the category, thus forming the off-line databases of the compression network model.

Optionally, the confirmation module of final reconfiguration scheme specifically includes:

A confirmation unit of final reconfiguration scheme, which is used for permuting and combining uncompressed switches in all loops by enumeration, taking their results into the power flow calculation model of the distribution network reconfiguration model by combining the switch states confirmed by the off-line databases to calculate the network power flows and network losses, and then selecting the switch combination with the smallest network loss as the final reconfiguration scheme.

According to embodiments provided in the present disclosure, the present disclosure discloses the following technical effects:

(1) In the present disclosure, a method is established for hybrid data-and-model-driven network reconfiguration to utilize the mathematical model of network reconfiguration and clustering in order to acquire optimal reconfiguration schemes and respective independent clusters for different load samples, and thereby databases are constructed for load samples and optimal reconfiguration schemes to learn the categories having the same optimal reconfiguration scheme in the databases in a data-driven way and then to form weight coefficients of the categories, thus forming off-line databases of different reconfiguration schemes.

(2) In the present disclosure, a method is formed for hierarchical reconfiguration by constructing a compression model and a decompression process of the distribution network, proves the equivalence of the proposed compression method, reduces variable dimensions, simplifies the calculation of network reconfiguration, and performs hierarchical decompression through the optimal reconfiguration scheme and clustering result of the compression network and by combining the model-and-data-driven result, in order to form a plurality of layers of independent decompression networks, with each decompression network corresponding to an off-line database.

(3) In the present disclosure, off-line databases of the optimal reconfiguration schemes are constructed in a data-and-model hybrid driving mode, and a plurality of layers of independent decompression networks are formed through the network compression model and the decompression process, whereby a method is constructed for combining on-line and off-line calculation so as to quickly obtain the decompression network at the last layer for the load sample through each off-line database, and to acquire the final optimal reconfiguration scheme by simple substitution calculation. Therefore, the time and the resource consumption for calculation are both effectively reduced.

BRIEF DESCRIPTION OF THE DRAWINGS

In order to illustrate the embodiments of the present disclosure or technical schemes in the prior art more clearly, the accompanying drawings required in the embodiments will be briefly introduced below. Apparently, the drawings in the following description are only some embodiments of the present disclosure, and those of ordinary skills in the art may obtain other drawings according to these drawings without creative work.

DETAILED DESCRIPTION (1) Technical schemes in the embodiments of the present disclosure will be described clearly and completely with reference to the accompanying drawings thereof. Apparently, the embodiments described herein are only part of, not all of, embodiments in the present disclosure. Based on the embodiments of the present disclosure, all other embodiments obtained by those of ordinary skills in the art without creative work belong to the scope claimed by the present disclosure.

So that the above mentioned purposes, features and advantages of the present disclosure can be more apparently understood, the present disclosure will be further described with reference to figures and embodiments below.

Figure 1:
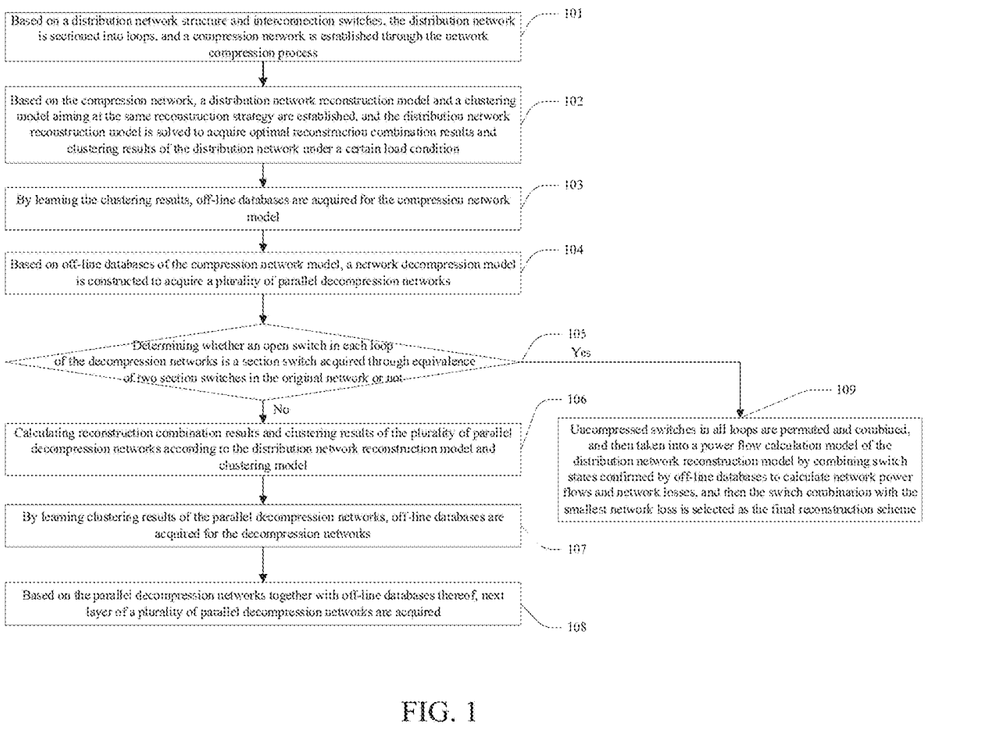
FIG. 1 is a flow chart of a method for hybrid data-and-model-driven hierarchical network reconfiguration.

FIG. 1 is a flow chart of a method of hierarchical network reconfiguration combining hybrid data-and-model-driven techniques. As shown in FIG. 1, a method for hybrid data-and-model-driven hierarchical network reconfiguration includes:

In Step 101: based on a distribution network structure and interconnection switches, the distribution network is sectioned into loops, and a compression network is established through the network compression process.

In the present disclosure, based on the distribution network structure and the interconnection switches and according to the principle of "including at least one interconnection switch and as few sectionalizing switches as possible", the distribution network is sectioned into loops, and sectionalizing switches and interconnection switches of the distribution network are divided among different loops.

Figure 2:
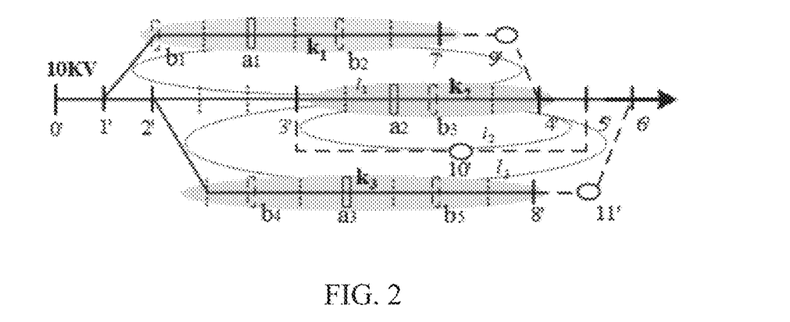
FIG. 2 is a schematic view of the network structure.

The distribution network sectioned into loops may be regarded as a directed graph G=(V,E,A) composed of nodes and branches, wherein V is a set of N nodes, E is a set of edges, and A is an adjacency matrix of the directed graph G. In the network structure as shown in FIG. 2, each branch corresponds to a sectionalizing switch or an interconnection switch. In FIG. 2, the number of branches connected with a node is named the degree of the node. According to the degree of the node, the network compression may be defined as follows.

(1) Definition 1: In the distribution network, several successive nodes of degree 2 are combined into the last node, and switches of corresponding branches are integrated into one sectionalizing switch, the process of which is referred to as network compression.

(2) According to Definition 1, the 28-node network as shown in FIG. 2 can be compressed into a 9-node network, and for example, the branch 1'7' is obtained by integrating 7 branches. After the compressed grid structure is obtained, network parameters are subjected to the equivalence process according to Theorem 1.

(3) Theorem 1: When the power loss before and after network compression does not change, several successive nodes of degree 2 can be equivalent to one node, and the corresponding node power and branch parameters satisfy formulas (1)-(2).

$$\begin{cases} R' = R_{01} + R_{12} + \ldots + R_{(n-1)n} \\ P' = \sqrt{\frac{(P_1 + P_2 + \ldots + P_n)^2 R_{01}}{(R_{01} + R_{12} + \ldots + R_{(n-1)n})} + \frac{(P_2 + \ldots + P_n)^2 R_{12}}{(R_{01} + R_{12} + \ldots + R_{(n-1)n})} + \ldots + \frac{P_n^2 R_{(n-1)n}}{(R_{01} + R_{12} + \ldots + R_{(n-1)n})}} \end{cases} \quad (1)$$

$$\begin{cases} X' = X_{01} + X_{12} + \ldots + X_{(n-1)n} \\ Q' = \sqrt{\frac{(Q_1 + Q_2 + \ldots + Q_n)^2 X_{01}}{(X_{01} + X_{12} + \ldots + X_{(n-1)n})} + \frac{(Q_2 + \ldots + Q_n)^2 X_{12}}{(X_{01} + X_{12} + \ldots + X_{(n-1)n})} + \ldots + \frac{Q_n^2 X_{(n-1)n}}{(X_{01} + X_{12} + \ldots + X_{(n-1)n})}} \end{cases} \quad (2)$$

Wherein R', X', P', and Q' are respectively the branch resistance, branch reactance, active power and reactive power at the node after the network compression equivalence, while $R_{(n-1)n}$, $X_{(n-1)n}$, $P_n$, and $x_n$ are respectively the branch resistance, branch reactance, active power and reactive power at the node n of the branch (n−1)n.

It is proven that:

The network loss may be calculated according to formulas (3)-(4).

$$\Delta P_{ij} = \frac{P_j^2 + Q_j^2}{U_j^2} k_{ij} R_{ij} \quad (3)$$

$$\Delta Q_{ij} = \frac{P_j^2 + Q_j^2}{U_j^2} k_{ij} X_{ij} \quad (4)$$

Wherein $\Delta P_{ij}$ and $\Delta Q_{ij}$ are respectively active loss and reactive loss of branch ij, $P_j$, $Q_j$, and $U_j$ are respectively active power, reactive power and node voltage of the node j, and $R_{ij}$ and $X_{ij}$ are respectively branch resistance and branch reactance of the branch $i_j$, with $k_{ij}$ indicating the open-closed state of the switch on the branch ij, 1 for switch closed and 0 for switch open.

Figure 3:
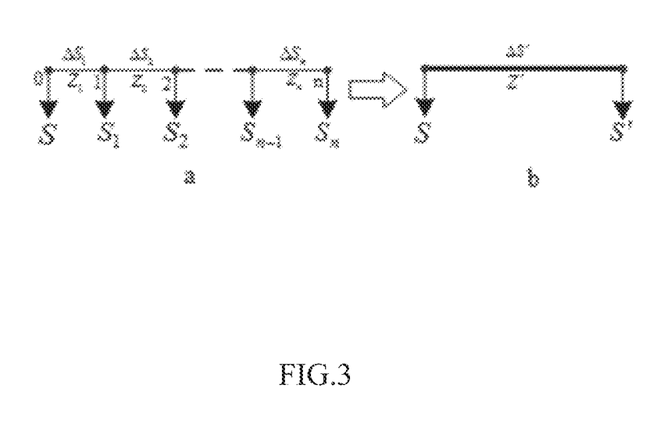
FIG. 3 is a schematic view of the equivalence process of the n-node branch.

The active loss of the n-node branch as shown in FIG. 3 is calculated according to formula (3).

$$\Delta P = \Delta P_1 + \Delta P_2 + \ldots + \Delta P_n$$
$$= \frac{(P_1 + P_2 + \ldots + P_n)^2}{U_1^2} R_{01} + \frac{(P_2 + \ldots + P_n)^2}{U_2^2} R_{12} + \ldots +$$
$$\frac{P_n^2}{U_n^2} R_{(n-1)n}$$
$$= \frac{(R_{01} + R_{12} + \ldots + X_{(n-1)n})}{U^2} \left( \frac{(P_1 + P_2 + \ldots + P_n)^2 R_{01}}{(R_{01} + R_{12} + \ldots + X_{(n-1)n})} + \right.$$
$$\left. \frac{(P_2 + \ldots + P_n)^2 R_{12}}{(R_{01} + R_{12} + \ldots + R_{(n-1)n})} + \ldots + \frac{P_n^2 R_{(n-1)n}}{(R_{01} + R_{12} + \ldots + R_{(n-1)n})} \right)^2$$
$$= \frac{R'}{U^2} P'^2$$

In consideration that the reactive power of a single branch is generally small, the second equality in formula (5) holds. In the case of normal operation of the distribution network, the voltage deviation between adjacent nodes is small, so the third equality of formula (5) holds. According to formula (5) and Definition 1, we can get that the n-node branch may be equivalent to a 1-node branch, i.e., the n-node branch is compressed by the branch a as shown in FIG. 3 and equivalent to the branch b, and the line parameters and node active power of the equivalent branches satisfy formula (1). According to the calculation formula (4) of reactive power loss and keeping the reactive power loss without change, we can get that the branch reactance and node reactive power after the branch compression and equivalence satisfy the formula (2).

In the network compression model proposed in Step 101, by combining the nodes of degree 2 in the network, the structure and loop division in the network are kept without change so as to acquire a compression network which lessens the number of nodes in the network and reduces the complexity of calculation.

In Step 101, the theorem of network compression is put forth to prove that, when the proposed compression network only has nodes of degree 2, the node power and branch impedance thereof are equivalent to those of the original network. However, there will be a slight deviation in network loss in the branch having nodes of degree greater than 2, which can be corrected by proposing a correction method to prove the availability of the proposed compression network.

The reason for the slight deviation is that, according to the compression model, the compressed branches are only affected by the branch impedance and node power directly related to them and thus can be regarded as equivalent in the internal network, while the network loss is co-determined by the impedance and node power of all branches, and as a result, the network loss of the branch having nodes of degree greater than 2 will show small deviation before and after the network compression.

In Step 102: based on the compression network, a distribution network reconfiguration model and a clustering model aiming at the same reconfiguration strategy are established, and the distribution network reconfiguration model is solved to acquire the optimal reconfiguration combination result and clustering result of the distribution network under a certain load condition, which specifically includes:

Based on the compression network, the distribution network reconfiguration model and the clustering model aiming at the same reconfiguration strategy are established, the harmony search algorithm is adopted, and the distribution network reconfiguration model is solved to obtain the optimal reconfiguration combination result under a certain load condition; and based on the optimal reconfiguration combination result, the clustering is performed which aims at the same strategy under the minimum network loss to acquire the clustering result.

(1) Mathematical Model of Distribution Network Reconfiguration

In the present disclosure, the distribution network reconfiguration is performed through switch state transition, and the reconfiguration is implemented on the basis of power flow calculation. In order to meet the requirements of radial operation of distribution network, the forward-backward sweep method is used for calculating network power flow. In this method, firstly, the network is pre-processed to find the root node and the connection relationship of the network; by assuming a constant node voltage, the power flow of each line is calculated by forward propagation; and then the voltage of each node is calculated by back propagation. The model of power flow calculation can be expressed as:

$$\Delta S_{ij} = \frac{P_j^2 + Q_j^2}{U_j^2} (R_{ij} + jX_{ij}), \tag{6}$$

$$S_i^{(k+1)} = S_j^{(k)} + \Delta S_{ij}^{(k+1)}, \tag{7}$$

$$U_j = U_i - (R_{ij} + jX_{ij}) \frac{\left(S_j^{(k+1)}\right)}{\left(U_i^{(k+1)}\right)^*}, \tag{8}$$

Wherein, ij is the branch between the nodes i and j, N is the number of nodes in the network, $R_{ij}$ and $X_{ij}$ are resistance and reactance of the branch ij, S is the power, and S=P+jQ, U is the voltage and U=U∠θ.

Since the network reconfiguration aims at minimizing the network loss, the network loss can be calculated by the result of power flow calculation, and the network loss of the entire network can be calculated by summing network losses of all branches as:

$$P_{loss} = \sum_{i,j \in N} P_{loss}(i,j) + \sum_k GC_{sw} = \sum_{i,j \in N} R_{ij} \frac{P_j^2 + Q_j^2}{U_j^2} + \sum_k GC_{sw}.$$

Wherein G is the number of switch changes, $C_{sw}$ is the loss of single switch action, and K is the number of switches.

As a result, the mathematical model of network reconfiguration aiming at minimizing the network loss can be acquired as:

$$\min f(K_S, G, U_j) = \sum_{i,j \in N} k_{ij} R_{ij} \frac{(P_j)^2 + (Q_j)^2}{U_j^2} + \sum_k GC_{sw} \tag{10}$$

$$s.t. U_{min} < |U_i| < U_{max}, \tag{11}$$

$$P_{cap}^- < P_{ij} < P_{cap}^+, \tag{12}$$

$$F(x) = 0, \tag{13}$$

$$\Delta P + \Sigma_{i \in N}(P_{Li}) \leq \Sigma_{i \in N} P_{Gi}, \quad (14)$$

$$\text{radial system,} \quad (15)$$

$$0 < +\Delta L p_j < P_j^{up} \quad (16)$$

$$0 < Q_j + \Delta L Q_j < Q_j^{up} \quad (17)$$

Wherein $P_{cap}^-$ and $P_{cap}^+$, are the upper and lower limits of power line transmission capacity, $k_{ij}$ is the switch of the branch ij and expressed as $l_{ij}$ if it is an interconnection switch, wherein the formula (13) is the power flow calculation constraint, and the formula (14) is the power balance constraint.

(2) Improving the Model Solution by the Harmony Search Algorithm

Given that the network reconfiguration model is a complex combinatorial optimization problem related to the graph theory, it is difficult to solve the problem by mathematical methods. As a heuristic algorithm, the harmony search algorithm may find the global optimal solution for the problem by updating and replacing the harmony matrix, and, as a result, the harmony search algorithm is used to solve the reconfiguration problem and improved on the basis of the operation characteristics of the distribution network. In the above process, each harmony refers to a feasible scheme of reconfiguration, which is expressed as an open switch in each loop determined in Step 101. In the present disclosure, the model solution is not limited to using the harmony search algorithm merely, but there are other solutions.

Based on results of the network loop division in Step 101, only one switch is allowed to be open in each loop during the reconfiguration so as to ensure the open-loop operation of the distribution network as required. The steps of improving the harmony search algorithm are as follows:

(1) Initialization. 5 parameters of the harmony search algorithm are initialized, and the harmony matrix size (HMS) corresponds to the size of the solution space, wherein each vector in the matrix represents a solution of the problem; a harmony matrix considering rate (HMCR) is selected for a certain solution from the harmony matrix; and the selected solution is precisely adjusted in pitch adjusting rate (PAR); band width (BW); and maximum number of iterations (Tmax). All solution spaces are sectioned into two parts, namely the initial harmony matrix and the residual harmony matrix which are randomly assigned and may be expressed as:

$$HM_{ini} = [k^1 k^2 \ldots k^{HMS}]^T, \quad (18)$$

$$HM_{left} = [k^{HMS} k^{HMS+1} \ldots k^{total}]^T, \quad (19)$$

Wherein $k^{HMS}$ is a harmonic vector which may be expressed as:

$$k^{HMS} = [k_1^{HMS} k_2^{HMS} \ldots k_n^{HMS}], \quad (20)$$

Wherein n represents the loop in the network, $k_i^n$ represents the open switch in the loop n, and the number of loops in the network is equal to the number of interconnection switches.

(2) Generating a new harmonic vector. A vector is selected from the initial harmony matrix and the residual harmony matrix. Generate a random value $\tau$ between 0 and 1. If $\tau < HMCR$, $k^{new} = k$, wherein k is the harmonic vector in the initial harmony matrix; if $\tau < PAR$, $k^{new} = k^{index + bw*a}$, wherein a is a randomly generated value between 0 and 1; otherwise $k^{new} = k^j$, $j \in [HMS, \ldots, \text{total}]$, wherein $k^j$ is the harmonic vector in the residual harmony matrix.

(3) Updating the harmony matrix, wherein the harmonic vector in the original harmony matrix is replaced with a new harmonic vector $k^{new}$ when the objective function (4) has a smaller net loss in the newly selected harmony matrix.

And (4) determining the termination condition, wherein the improved harmony search algorithm stops when the maximum iteration number Tmax is reached or the network loss difference between the previous and afterward updates is less than $10^{-5}$.

Based on this algorithm, the mathematical model of network reconfiguration is solved to acquire the optimal reconfiguration combination result of the network under a certain load condition.

Correction: since the node is of degree greater than 2, the network loss of the series branch in the compression network deviates from that of the corresponding branch in the original network. In addition, as the distribution network is designed in the form of a closed loop, the sectionalizing switch and interconnection switch associated with the node of degree greater than 2 in one loop are located on different series branches. The network change of the series branch located at the node of degree greater than 2 will lead to false determination of the sectionalizing switch state and the interconnection switch state. Therefore, the correction method shown in formula (22) is proposed, wherein by comparing and separating the network losses of the sectionalizing switch and the interconnection switch, the minimum value is selected as the optimal strategy to obtain the optimal result.

$$\min(f(K_{Sl}^B, G^*, U_j^*), f(K_{Sl}^T, G^*, U_j^*)) \quad (21)$$

Wherein $K_{Sl}^B$ is the sectionalizing switch of loop 1, and $K_{Sl}^T$ is the interconnection switch of loop 1.

$K_S^*$ is adopted to represent the optimal reconfiguration combination result. Combined with the solution and correction method of distribution network reconfiguration problem, the optimal reconfiguration combination result will satisfy:

$$f(K_S^*, \Delta L P_j^*, \Delta L Q_j^*, G^*, U_j^*) \leq f(K_S, \Delta L p_j, \Delta L Q_j, G, U_j) \quad (22)$$

Aim-oriented clustering is performed on the basis of the distribution network reconfiguration problem, which aims at minimizing the distance of each optimal reconfiguration strategy under the condition of the minimum network loss, and targets the same optimal reconfiguration strategy to form the cluster, wherein the clustering process is to solve the following problem:

$$\Gamma_m \in \arg\min g(K_S^*(\Gamma_m(K_{Sm}^*)), K_{Sm}^*), 1 \leq m \leq M, \quad (23)$$

Wherein $K_{Sm}^*$ is the optimal reconfiguration strategy in the cluster m, and $\Gamma_m$ is the Euclidean distance between the optimal reconfiguration strategy $K_{Sm}^*$ and its expression $\Gamma_m(K_{Sm}^*)$. m is the ordinal of clusters, M is the total number, and g(•) is the objective function of clustering.

The clustering result can be expressed as:

$$C_m^* = \{K_{Sm}^* | g(K_{Sm}^*, K_{S-m}) \leq g(K_{Sm}, K_{S-m}), 1 \leq m \leq M\} \quad (24)$$

Wherein $C_m^*$ is the cluster m, and $K_{S-m}$ is the reconfiguration strategy excluding the cluster m.

In Step 103: By learning the clustering results, off-line databases are acquired for the compression network model. As an optional implementation, the LSTM deep learning network is used to learn the clustering results, and each cluster forms one category to learn, and various weight coefficients are formed for the category, thus forming off-line databases of the compression network model. The present disclosure may also adopt other methods to learn the clustering result, which are not limited to the LSTM deep learning network mentioned in the present disclosure.

A data-driven model based on the measurement data of smart meters is constructed, and in the off line case, the LSTM deep learning network is adopted for learning the clustering result to form respective weight coefficients for clusters, thus forming the off-line databases of the compression network.

Based on Step 102, we can get the optimal switch combination and clusters of the network reconfiguration. Based on these clusters and samples of load data, a data set is constructed for reconfigured loads and clusters corresponding to switch combinations. The deep learning model is adopted for learning to form weight coefficients of various categories. Since the learning processes of all samples are off line, they are also called off-line databases.

As a same user's daily load shows a similar distribution rule, and there is time coupling in the load distribution in one day, the load distribution has time series features. The Long and Short Term Memory network (LSTM) may well solve the time-dependent problem, so this network is used to construct a data-driven model.

The LSTM network is featured by two parts: the optimal reconfiguration combination result and the network parameters, whereby forming a feature matrix:

$$Pi \in N \times 2 \quad (25)$$

Among them, N is the number of nodes in the network, which is sorted according to the label of the network, and 2 represents the active power and reactive power at each node which are calculated by the reconfiguration mathematical model, wherein each feature will impact the sectioning accuracy of network reconfiguration clusters.

The max-min normalization is used to narrow the size of each feature to 0-1. The network reconfiguration aims at obtaining different reconfiguration results (i.e., switch combinations), so the output of the LSTM network becomes the category mark of each optimal reconfiguration scheme.

Taking the feature matrix as the input and the cluster label as the output, the forget gate mechanism in the hidden layer of LSTM network (there are three layers in total including the input layer, hidden layer and output layer) will help form the relationship between input and output and minimize the learning error:

$$I(h) = \sum_{q=1}^{Q} \left( D(x_q^h) - y_q^h \right)^2 \quad (26)$$

Wherein, Q is the number of nodes in the output layer, $u_q(\cdot)$ is the output function of the node q, which represents the real output result, and $y_q^t$ is the ideal output result of the node q.

In the learning of LSTM network, the same optimal reconfiguration scheme obtained through clustering is regarded as a category to learn the relationship between the power at each node and the optimal reconfiguration scheme on the basis of each category. The category is expressed as:

$$L_m = \{l_m | K_1^* = K_2^* = \ldots = K_{sm}^*, 1 \leq m \leq M\} \quad (27)$$

Wherein, $L_m$ is the category, $K_1^*$ and $K_2^*$ are the optimal reconfiguration combination results under different load distributions.

By learning the clustering result through the LSTM network, multiple databases will be formed for all samples, enabling distinguishing which database a certain sample should pertain to, wherein each database contains samples with the same optimal reconfiguration combination result.

According to the data-driven method mentioned in Step 103, based on the solution result of the network reconfiguration and clustering mathematical model in Step 102, the LSTM network is used for learning, and the clustering model is calculated to obtain several types of clustering results which each corresponds to an optimal reconfiguration scheme, and off-line reconfiguration databases are formed for learning weight coefficients between input feature and optimal reconfiguration results. Through various off-line databases, we can quickly distinguish the reconfiguration strategy of a certain load distribution.

In Step 104: Based on the off-line databases of the compression network model, a network decompression model is constructed to acquire a plurality of parallel decompression networks.

Based on the off-line databases formed by the LSTM network's learning of the compression power network in Step 103, a network decompression model is constructed. Based on the compression network, according to the LSTM network's learning of clusters, part of compressed areas are decompressed in each loop described in Step 101 to form a plurality of parallel first decompression networks.

According to the compression network off-line databases obtained in Step 103, the state of the switch in the compression network can be obtained. If an equivalent switch is in the open state, its specific position needs to be further determined according to the network decompression algorithm.

The specific process of the network decompression algorithm in the present disclosure is shown as follows.

(1) Determining whether the open switch of the branch ij in the compression network is the equivalent switch obtained in Step 1, and, if so, executing (2)-(4), otherwise executing (5);

(2) Determining the number m of sectionalizing switches of the branch in the original network corresponding to the branch ij in the compression network, and, if m=2, executing (5), otherwise adding a sectionalizing switch i' in the branch ij of the compression network, and executing (3)-(4);

(3) If m=2k+1(k∈N+), the branch ii' of the compression network includes k sectionalizing switches included in the corresponding branch of the original network, while the branch i'j includes (k+1) sectionalizing switches on the corresponding branch;

(4) If m=2k(k∈N+), the branch ii' of the compression network includes k sectionalizing switches included in the corresponding branch of the original network, while the branch i'j includes k sectionalizing switches on the corresponding branch;

(5) Terminating the network decompression algorithm.

According to the compression network architecture as shown in FIG. 2, it is assumed that in a certain number of load samples, three categories of optimal reconfiguration results may be obtained by using the network reconfiguration model in Step 102, and each category of results has an open equivalent switch, namely, the equivalent switch 7' that is open in the first category of results, the equivalent switch 4' that is open in the second category, and the equivalent switch 8' that is open in the second category. According to the network decompression algorithm, the branches where the three equivalent switches are located will be decompressed to form 3 independent decompression networks. The decompression results are as shown in FIG. 3, wherein a sectionalizing switch $a^1$ is added in the branch 1'7' of the first network, a sectionalizing switch $a_2$ is added in the branch 3'4' of the second network, and a sectionalizing switch $a_3$ is added in the branch 2'8' of the third network.

The network decompression process mentioned in Step 104 forms a plurality of off-line databases based on the compression network in Step 101 and the clustering learning in Step 103 of the network reconfiguration results in Step 102, and decompresses the branches of the compression network according to the switch combination corresponding to each database, so that the compression network approaches the original network. For example, in FIG. 2, if one of the optimal reconfiguration combination results of the network is 7', 10' and 11', the switch 7' in the loop $K_1$ is decompressed to obtain the first decompression network. Decompression is cycled according to the above mentioned process until reaching the stop condition in Step 8.

In Steps 102-104, a hybrid data-model-driven reconfiguration scheme is formed by the network reconfiguration mathematical model and the data-driven deep learning model; the model-driven method is used to solve the optimal reconfiguration combination result of different load samples; databases of load samples and the optimal reconfiguration schemes are formed on the basis of the optimal reconfiguration combination result, and the learning of clustering result are performed through the data-driven LSTM network to form weight coefficients of various clusters. The hierarchical network reconfiguration is performed by combining the network compression model and decompression algorithm.

In Step 105: It is determined whether an open switch in each loop of the decompression networks is a sectionalizing switch acquired through equivalence of No sectionalizing switches in the original network or not.

In Step 106: If not, the reconfiguration combination results of the plurality of parallel decompression networks are calculated according to the distribution network reconfiguration model.

After Step 104, the network architecture of the first decompression network is obtained, which has several switches added in each loop in comparison to the compression network in Step 101. Similarly, the distribution network reconfiguration model described in Step 102 is used to calculate the optimal reconfiguration scheme and cluster for each first decompression network to obtain the reconfiguration scheme data set and cluster corresponding to each first decompression network respectively.

In Step 107: By learning the clustering result of the parallel decompression networks, off-line databases are acquired for the decompression networks;

Based on the reconfiguration scheme data set of the first decompression network obtained in Step 106, the input and output characteristics and the learning process of the LSTM network described in Step 103 are used to learn the data set of the first decompression network, wherein each cluster still forms one category to learn the classification basis of each sample (i.e., the weight coefficients of the network), thereby each off-line database of the first decompression network is constructed.

In Step 108: Based on the parallel decompression networks together with the off-line databases thereof, the next layer of a plurality of parallel decompression networks are acquired, and the process returns to the step "determining if an open switch in each loop of the decompression network is a sectionalizing switch acquired through equivalence of No sectionalizing switches in the original network or not".

According to the reconfiguration scheme of the first decompression network in Step 107, and based on the network decompression algorithm in Step 104, the three parallel networks (networks respectively added with sectionalizing switches $a_1$, $a_2$, $a_3$) obtained from the first decompression are further decompressed, which is to add decompression branches $b_1$, $b_2$ in the loop $K_1$ of the first category of the first decompression network to obtain two independent second decompression networks; to add a decompression branch $b_3$ in the loop $K_2$ of the second category of the first decompression network to obtain a second decompression network; and to add decompression branches $b_4$, $b_5$ in the loop $K_3$ of the third category of the first decompression network to obtain two independent second decompression networks. As shown in FIG. 2, 5 independent second decompression networks are obtained in total.

"Return to the step of determining whether an open switch in each loop of the decompression networks is a sectionalizing switch acquired through equivalence of No sectionalizing switches in the original network or not" herein is equal to cycling Steps 107-109, and the decompression process stops until the number of switches in each loop of the compression network is less than or equal to No between the last decompression network and the original network according to Step 101. As shown in FIG. 2, the distribution network added with sectionalizing switches $a_1, a_2, a_3, b_1, b_2, b_3, b_4, b_5$ becomes the last layer of the decompression networks.

In Step 109: If yes, uncompressed switches in all loops are to be permuted and combined, and then taken into a power flow calculation model of the distribution network reconfiguration model by combining the switch states confirmed by the off-line databases to calculate the network power flows and network losses, and then the switch combination with the smallest network loss is selected as the final reconfiguration scheme, which specifically includes:

The uncompressed switches in all loops are permuted and combined by enumeration, and then taken into the power flow calculation model of the distribution network reconfiguration model by combining the switch states confirmed by the off-line databases to calculate the network power flows and network losses, and then the switch combination with the smallest network loss is selected as the final reconfiguration scheme.

According to the last layer of decompression network obtained in Step 108, the final reconfiguration scheme is still not determinable. However, the open-closed state determination is only necessary for No sectionalizing switches at most in each loop, which greatly reduces the solution space compared with the original network. Therefore, the enumeration method can be used to obtain the optimal reconfiguration scheme, which is to permute and combine the sectionalizing switches that may be in open state in each loop, and the possible reconfiguration schemes are brought into the network reconfiguration model described in Step 102 respectively to calculate the corresponding network losses, and the switch combination with the smallest network loss is selected as the optimal reconfiguration scheme. The following problem is to be solved:

$$\min\{A, B, \ldots \ |A=f(k1^n), B=f(k2^n), \ldots\}$$

$$s.t. U_{min} < |U_i| < U_{max},$$

$$P_{cap}^- < P_{ij} < P_{cap}^+,$$

$$i. F(x)=0$$

Wherein, $k1''$ and $k2''$ respectively represent two switch combinations of the category n in the database at the last layer, "1" for closed switch, and "0" for open switch.

The reconfiguration method constructed in Steps 102-109 combining off-line and on-line calculation can effectively reduce the on-line computing time and the consumption of calculation resources. Since the database is constructed off line in this process, the on-line calculation process of any load sample will be classified in the already constructed database, and the remaining switch states in the hierarchically reconfigured network are permuted and combined by the enumeration method described in Step 109 and directly taken into the reconfiguration model to solve the network losses, and the switch combination with the smallest network loss is selected as the optimal reconfiguration scheme of the original network.

Firstly, according to the principle of loop sectioning in the distribution network defined in the present disclosure, loops are sectioned in the network topology, which lays a foundation for the optimization solution framework of the reconfiguration strategy. Then, the network compression model and the mathematical models of distribution network reconfiguration and clustering are established respectively, and the improved harmony search algorithm is used to solve the optimal reconfiguration scheme, wherein the same optimal reconfiguration schemes are clustered into one category; according to the data of each load sample and its corresponding optimal reconfiguration scheme cluster, a learning model is constructed by adopting the data-driven method, and off-line databases of the compression network are established respectively by categories based on the result of data-driven learning. The network decompression model is established, and the network is decompressed according to the topological structure of the compression network and the optimal reconfiguration scheme, in order to obtain a plurality of independent decompression networks. The network decompression process will last hierarchically along with the hybrid data-model-driven method until reaching the termination condition. After the hierarchical decompression process is accomplished, each loop of the last-layer decompression network differs from that of the original network by at most two switches. The enumeration method is used to permute and combine switches of different loops, and the results are directly taken into the reconfiguration model for calculation to acquire corresponding network losses. The reconfiguration strategy corresponding to the minimum network loss is selected as the optimal reconfiguration strategy, thereby completing the optimization and solution of the reconfiguration strategy.

Figure 4:
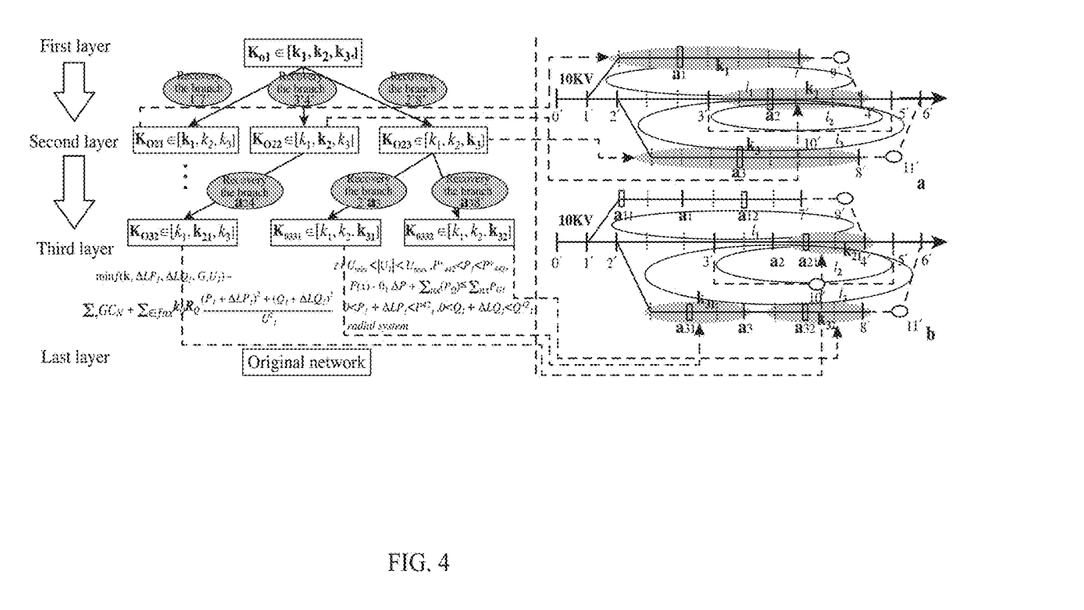
FIG. 4 is a schematic view of the decompression process of the hierarchical network.

In FIG. 4, $k_0$ is the optimal reconfiguration scheme of each layer $k_t$, $t \in \{1,2,3\}$ is the state set of each switch in each loop $l_t$, and $k_t$ is the state set of the determined switch in the loop $l_t$. The hierarchical decompression process of the network is determined by the switch state. The first layer corresponds to the compressed network, which is shown in FIG. 4 as a 9-node system. According to its off-line database and network topology structure, sectionalizing switches $a_1, a_2, a_3$ are added to the branch 1'7', branch 3'4' and branch 2'8' respectively to obtain three independent decompression networks in the second layer. It can be seen from network a in FIG. 4 that it has not reached the condition to stop decompression at this time, so off-line databases are respectively established for parallel networks in the second layer and decompressed to obtain corresponding independent decompression networks in the third layer, such as the third network in the second layer; and branches 2', $a_3$ and $a_3$, 8' are respectively decompressed to obtain two independent decompression networks in the third layer; and it can be seen from the network b in FIG. 4 that it has reached the condition to stop decompression at this time, so the hierarchical decompression process stops.

The present disclosure provides a method for hybrid data-and-model-driven hierarchical network reconfiguration. The optimal reconfiguration strategies and clusters of multiple samples are obtained through the mathematical model of network reconfiguration and clustering aiming at the same reconfiguration strategy, thereby the off-line databases of load samples and reconfiguration strategies are constructed by learning the cluster characteristics realized by the deep learning model; a network compression model is proposed to narrow the solution space of distribution network reconfiguration problems; and a hierarchical decompression process of the compression network is constructed by combining the off-line databases obtained through a data-driven model, thereby a solution method combining on-line and off-line calculation is constructed. By virtue of the off-line databases, the minimum range of open switches in each loop is quickly located, and then the possible reconfiguration strategies in the narrowed solution space are directly taken into the reconfigured data model to calculate the corresponding network losses and obtain the optimal reconfiguration scheme, thus reducing the calculation time and the consumption of calculation resources.

The present disclosure provides a method for hybrid data-and-model-driven hierarchical network reconfiguration, which takes into consideration the network reconfiguration and clustering mathematical models, and databases composed of the optimal reconfiguration scheme obtained by an improved model and corresponding load samples; this method adopts a data-driven method to learn the same clustering results, constructs off-line databases based on the learning result, constructs a hierarchical decompression network by decompressing the solution model, and combines on-line and off-line methods to solve the optimal reconfiguration scheme step by step.

By adopting the hierarchical reconfiguration method described in the present disclosure, the method may be applied to the existing power system, and the method combining on-line and off-line methods may be used to reduce the time and resource consumption of network reconfiguration calculation. In the background of a large quantity of distributed photovoltaic connection into the distribution network, the present disclosure provides a solution for the optimized energy scheduling on the distribution network side, the reconfiguration can be performed as required according to the load changes of the distribution network, and the grid structure may be adjusted in order to reduce network losses caused by network operation. The proposed hybrid data-model driving mode will use the off line calculation resources in the power grid to calculate the off-line databases of the optimal reconfiguration strategy of each layer of network after hierarchy, and bring in the node load information of the network when actually executing the network reconfiguration calculation, thus enabling quick narrowing of the solution space of the reconfiguration problems by finding the match of the optimal reconfiguration scheme in each database, thereby reducing the occupation of calculation resources by reconfiguration calculation, and arranging the optimal switch combination of network operation more efficiently, faster and more economically. In addition to being used in the network reconfiguration, the proposed models of network compression and hierarchical decompression combining hybrid data-and-model driving modes may also be promoted to various calculation scenarios designed for data compression and recovery, such as optimized scheduling of vehicle networking and optimized energy scheduling of P2P, which can increase the efficiency of calculation optimization so as to support real-time calculation requirements.

Figure 5:
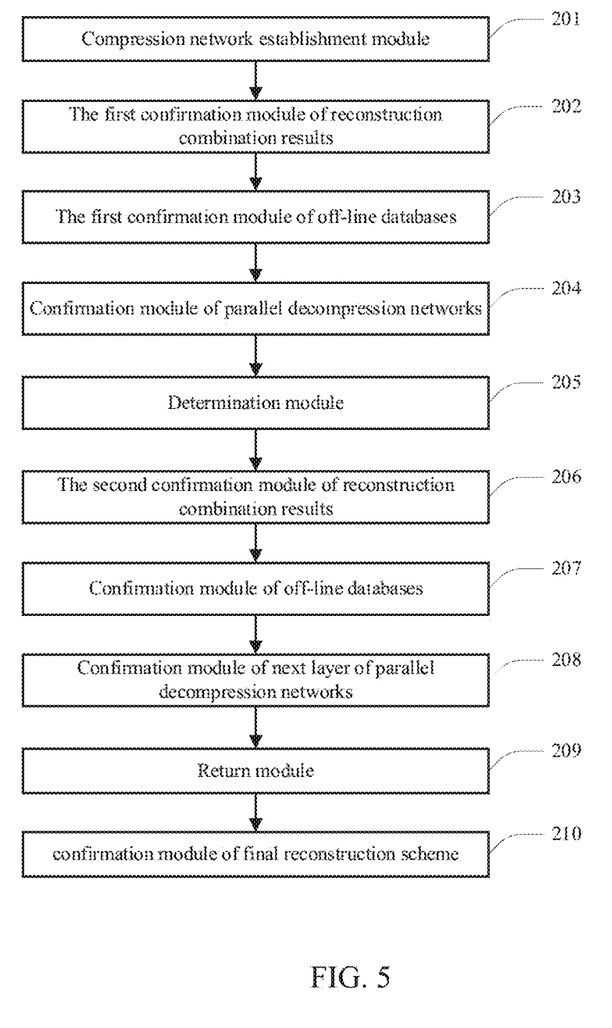
FIG. 5 is a structural view of a system of hybrid data-and-model-driven hierarchical network reconfiguration.

FIG. 5 is a structural view of a system of hybrid data-and-model-driven hierarchical network reconfiguration. As shown in FIG. 5, a system of hybrid data-and-model-driven hierarchical network reconfiguration includes:

A compression network establishment module 201, which is used to section the distribution network into loops based on the distribution network structure and interconnection switches, and then a compression network is established.

A first confirmation module of reconfiguration combination results 202, which is used for establishing the distribution network reconfiguration model and the clustering model aiming at the same reconfiguration strategy based on the compression network, and solving the distribution network reconfiguration model to acquire the optimal reconfiguration combination results and thus performing the clustering which aims at the same strategy under the minimum network loss.

A first confirmation module of off-line databases 203, which is used for acquiring off-line databases for the compression network model by learning the clustering results with the LSTM deep learning network.

A confirmation module of parallel decompression networks 204, which is used for constructing the network decompression model based on the off-line databases of the compression network model to acquire a plurality of parallel decompression networks.

A determination module 205, which is used for determining whether the open switch in each loop of the decompression networks is a sectionalizing switch acquired through equivalence of No sectionalizing switches in the original network or not.

A second confirmation module of reconfiguration combination results 206, which is used for, if the open switch in each loop of the decompression networks is not the sectionalizing switch acquired through equivalence of No sectionalizing switches in the original network, calculating the reconfiguration combination results of the plurality of parallel decompression networks according to the distribution network reconfiguration model.

A first confirmation module of off-line databases 207, which is used for acquiring off-line databases for the compression network model by learning the clustering results with the LSTM deep learning network.

A confirmation module of the next layer of parallel decompression networks 208, which is used for acquiring the next layer of a plurality of parallel decompression networks based on the parallel decompression networks and the off-line databases thereof.

A return module 209 used for returning to the step of "determining whether the open switch in each loop of the decompression networks is a sectionalizing switch acquired through equivalence of No sectionalizing switches in the original network or not".

A confirmation module of final reconfiguration scheme 210, which is used for, if the open switch in each loop of the decompression networks is the sectionalizing switch acquired through equivalence of No sectionalizing switches in the original network, permuting and combining uncompressed switches in all loops, taking their results into the power flow calculation model of the distribution network reconfiguration model by combining the switch states confirmed by the off-line databases to calculate the network power flows and network losses, and then selecting the switch combination with the smallest network loss as the final reconfiguration scheme.

The first confirmation module of reconfiguration combination results 202 specifically includes:

A confirmation unit for optimal reconfiguration combination results, which is used for establishing the distribution network reconfiguration model based on the compression network, adopting the harmony search algorithm, and solving the distribution network reconfiguration model to acquire the optimal reconfiguration combination results under a certain load condition;

A clustering result confirmation unit, which is used for performing the clustering which aims at the same strategy under the minimum network loss based on the optimal reconfiguration combination results to acquire the clustering result.

The first confirmation module of off-line database 203 specifically includes:

A first confirmation module of off-line databases, which is used for adopting the LSTM deep learning network to learn the clustering result, wherein each cluster forms one category to learn, and various weight coefficients are formed for the category, thus forming the off-line databases of the compression network model.

The final confirmation module of reconfiguration scheme 210 specifically includes:

A confirmation unit of final reconfiguration scheme, which is used for permuting and combining uncompressed switches in all loops by enumeration, taking their results into the power flow calculation model of the distribution network reconfiguration model by combining the switch states confirmed by the off-line databases to calculate the network power flows and network losses, and then selecting the switch combination with the smallest network loss as the final reconfiguration scheme.

In this specification, various embodiments are described in a progressive manner, with each embodiment focusing on its differences from other embodiments, while cross reference would be enough for those same or similar parts between the embodiments. As the system disclosed in the embodiment corresponds to the method disclosed in the embodiment, the description is relatively simple, and the correlated parts can be found in the method description.

Principles and implementation of this present disclosure are described by specific examples, and the explanation of the above embodiments is only used to help understand the method and its core idea of the present disclosure. Also, those of ordinary skills in the art may take some modifications in the specific implementation and application scope according to the idea of the present disclosure. To sum up, the content of this specification should not be construed as limiting the present disclosure.

What is claimed is:

1. A method for hybrid data-and-model-driven hierarchical network reconfiguration, comprising:

based on a distribution network structure and interconnection switches, sectioning the distribution network into loops and establishing a compression network through a network compression process, wherein according to a principle of including at least one interconnection switch and as few sectionalizing switches as possible, the distribution network is sectioned into loops, and the sectionalizing switches and the interconnection switches of the distribution network are divided among different loops; the distribution network sectioned into loops is a directed graph G=(V,E,A) composed of nodes and branches, wherein V is a set of N nodes, E is a set of edges, and A is an adjacency matrix of the directed graph G; the compression network is established by combining several successive nodes connected with two branches into a last node, and integrating switches of corresponding branches into one sectionalizing switch;

based on the compression network, establishing a distribution network reconfiguration model and a clustering model aiming at a same reconfiguration strategy, solving the distribution network reconfiguration model to obtain substantially optimal reconfiguration combination results of the distribution network under a certain load condition and based on the optimal reconfiguration combination results, performing a clustering which aims at a same strategy under a substantially minimum network loss to acquire clustering results;

using a Long Short Term Memory (LSTM) deep learning network to learn the clustering results, to acquire off-line databases for the compression network model;

based on the off-line databases of the compression network model, constructing a network decompression model to acquire a plurality of parallel decompression networks by adopting a network decompression algorithm; wherein the network decompression algorithm is performed when an equivalent switch is in an open state, the network decompression algorithm comprises:

(1) determining whether an open switch of branch ij in the compression network is the equivalent switch, when the open switch of branch ij in the compression network is the equivalent switch, executing (2)-(4), otherwise executing (5);

(2) determining a number m of sectionalizing switches of the branch in an original network corresponding to the branch ij in the compression network, and, when m=2, executing (5), otherwise adding a sectionalizing switch i' in the branch ij of the compression network, and executing (3)-(4);

(3) when m=2k+1(k∈N+), determining that the branch ii' of the compression network includes k sectionalizing switches included in the corresponding branch of the original network, and the branch i'j includes (k+1) sectionalizing switches on the corresponding branch;

(4) when m=2k(k∈N+), determining that the branch ii' of the compression network includes k sectionalizing switches included in the corresponding branch of the original network, and the branch i'j includes k sectionalizing switches on the corresponding branch; and (5) terminating the network decompression algorithm; determining whether an open switch in each loop of the decompression networks is a sectionalizing switch acquired through equivalence of $n_0$ sectionalizing switches in the original network or not;

when the open switch in each loop of the decompression networks is not the sectionalizing switch acquired through equivalence of the $n_0$ sectionalizing switches in the original network, calculating the reconfiguration combination results and the clustering results of the plurality of parallel decompression networks according to the distribution network reconfiguration model and the clustering model;

using the LSTM deep learning network to learn by learning the clustering results of the parallel decompression networks, to acquire off-line databases for the decompression networks;

based on the plurality of parallel decompression networks together with the off-line databases thereof, acquiring a next layer of a plurality of parallel decompression networks and returning processing to the step "determining whether an open switch in each loop of the decompression network is a sectionalizing switch acquired through equivalence of the $n_0$ sectionalizing switches in the original network or not";

when the open switch in each loop of the decompression networks is the sectionalizing switch acquired through equivalence of no sectionalizing switches in the original network, uncompressed switches in all loops are to be permuted being combined, and then being taken into a power flow calculation model of the distribution network reconfiguration model by combining the switch states confirmed by the off-line databases to calculate the network power flows and network losses, and then the switch combination with the smallest network loss being selected as the final reconfiguration scheme.

2. The method for hybrid data-and-model-driven hierarchical network reconfiguration according to claim 1, wherein
solving the distribution network reconfiguration model to obtain the substantially optimal reconfiguration combination results of the distribution network under the certain load condition comprises:
adopting a harmony search algorithm to solve the distribution network reconfiguration model to acquire the substantially optimal reconfiguration combination results under the certain load condition.

3. The method for hybrid data-and-model-driven hierarchical network reconfiguration according to claim 1,
wherein each cluster forms one category to learn, and various weight coefficients are formed for the category, thus forming off-line databases of the compression network model.

4. The method for hybrid data-and-model-driven hierarchical network reconfiguration according to claim 1, comprising the uncompressed switches in all loops being permuted and combined by enumeration and then being taken into a power flow calculation model of the distribution network reconfiguration model by combining the switch states confirmed by the off-line databases to calculate the network power flows and network losses, and a switch combination with the smallest network loss being selected as the final reconfiguration scheme, which specifically comprises:
the uncompressed switches in all loops being permuted and combined by enumeration and then being taken into the power flow calculation model of the distribution network reconfiguration model by combining the switch states confirmed by the off-line databases to calculate the network power flows and network losses and a switch combination with the smallest network loss being selected as the final reconfiguration scheme.

5. A system of hybrid data-and-model-driven hierarchical network reconfiguration, comprising:
a distribution network comprising a plurality of interconnection switches; and
a computer comprising a processor and a memory having program instructions stored on, wherein when the processor executes the program instructions stored on the memory, the processor is configured to:

section the distribution network into loops based on a distribution network structure and interconnection switches and establish a compression network through the network compression process; wherein according to a principle of "including at least one interconnection switch and as few sectionalizing switches as possible", the distribution network is sectioned into loops, and the sectionalizing switches and the interconnection switches of the distribution network are divided among different loops; the distribution network sectioned into loops is a directed graph G=(V,E,A) composed of nodes and branches, wherein V is a set of N nodes, E is a set of edges, and A is an adjacency matrix of the directed graph G; the compression network is established by combining several successive nodes connected with two branches into a last node, and integrating switches of corresponding branches into one sectionalizing switch;

establish the distribution network reconfiguration model and the clustering model aiming at the same reconfiguration strategy based on the compression network, solve the distribution network reconfiguration model to acquire the substantially optimal reconfiguration combination results of the distribution network under a certain load condition and based on the substantially optimal reconfiguration combination results, perform a clustering which aims at a same strategy under a minimum network loss to acquire clustering results;

acquire the off-line databases for the compression network model by learning the clustering results using a Long Short Term Memory (LSTM) deep learning network;

construct the network decompression model to acquire a plurality of parallel decompression networks by adopting a network decompression algorithm based on the off-line databases of the compression network model; wherein the network decompression algorithm is performed when an equivalent switch is in an open state, the network decompression algorithm comprises:

(1) determining whether an open switch of branch ij in the compression network is the equivalent switch, when the open switch of branch ij in the compression network is the equivalent switch, executing (2)-(4), otherwise executing (5);

(2) determining a number m of sectionalizing switches of the branch in an original network corresponding to the branch ij in the compression network, and, when m=2, executing (5), otherwise adding a sectionalizing switch i' in the branch ij of the compression network, and executing (3)-(4);

(3) when m=2k+1(k∈N+), determining that the branch ii' of the compression network includes k sectionalizing switches included in the corresponding branch of the original network, and the branch i'j includes (k+1) sectionalizing switches on the corresponding branch;

(4) when m=2k(k∈N+), determining that the branch ii' of the compression network includes k sectionalizing switches included in the corresponding branch of the original network, and the branch i'j includes k sectionalizing switches on the corresponding branch; and (5) terminating the network decompression algorithm;

to determine whether an open switch in each loop of the decompression networks is a sectionalizing switch acquired through equivalence of $n_0$ sectionalizing switches in the original network or not;

when the open switch in each loop of the decompression networks is not the sectionalizing switch acquired through equivalence of the $n_0$ sectionalizing switches in the original network, calculate the reconfiguration combination results and the clustering results of the plurality of parallel decompression networks according to the distribution network reconfiguration model and the clustering model;

acquire off-line databases for the decompression networks by using the LSTM deep learning network to learn the clustering results of the parallel decompression networks;

acquire the next layer of a plurality of parallel decompression networks based on the parallel decompression networks and the off-line database thereof;

return to the step of "determining whether an open switch in each loop of the decompression networks is a sectionalizing switch acquired through equivalence of No the no sectionalizing switches in the original network or not";

when the open switch in each loop of the decompression networks is the sectionalizing switch acquired through equivalence of the $n_0$ sectionalizing switches in the original network, permute and combine the uncompressed switches in all loops, take their results into the power flow calculation model of the distribution network reconfiguration model by combining the switch states confirmed by the off-line databases to calculate the network power flows and network losses, and then select the switch combination with the smallest network loss as the final reconfiguration scheme.

6. The system of hybrid data-and-model-driven hierarchical network reconfiguration according to claim 5, wherein the processor is further configured to:

adopt the harmony search algorithm, to solve the distribution network reconfiguration model to acquire the substantially optimal reconfiguration combination results under the certain load condition.

7. The system of hybrid data-and-model-driven hierarchical network reconfiguration according to claim 5:

wherein each cluster forms one category to learn, and various weight coefficients are formed for the category, thus forming the off-line databases of the compression network model.

8. The system of hybrid data-and-model-driven hierarchical network reconfiguration according to claim 5, wherein the processor is further configured to:

permute and combine uncompressed switches in all loops by enumeration, take their results into the power flow calculation model of the distribution network reconfiguration model by combining the switch states confirmed by the off-line databases to calculate the network power flows and network losses, and then select the switch combination with the smallest network loss as the final reconfiguration scheme.

* * * * *